Patented Apr. 22, 1952

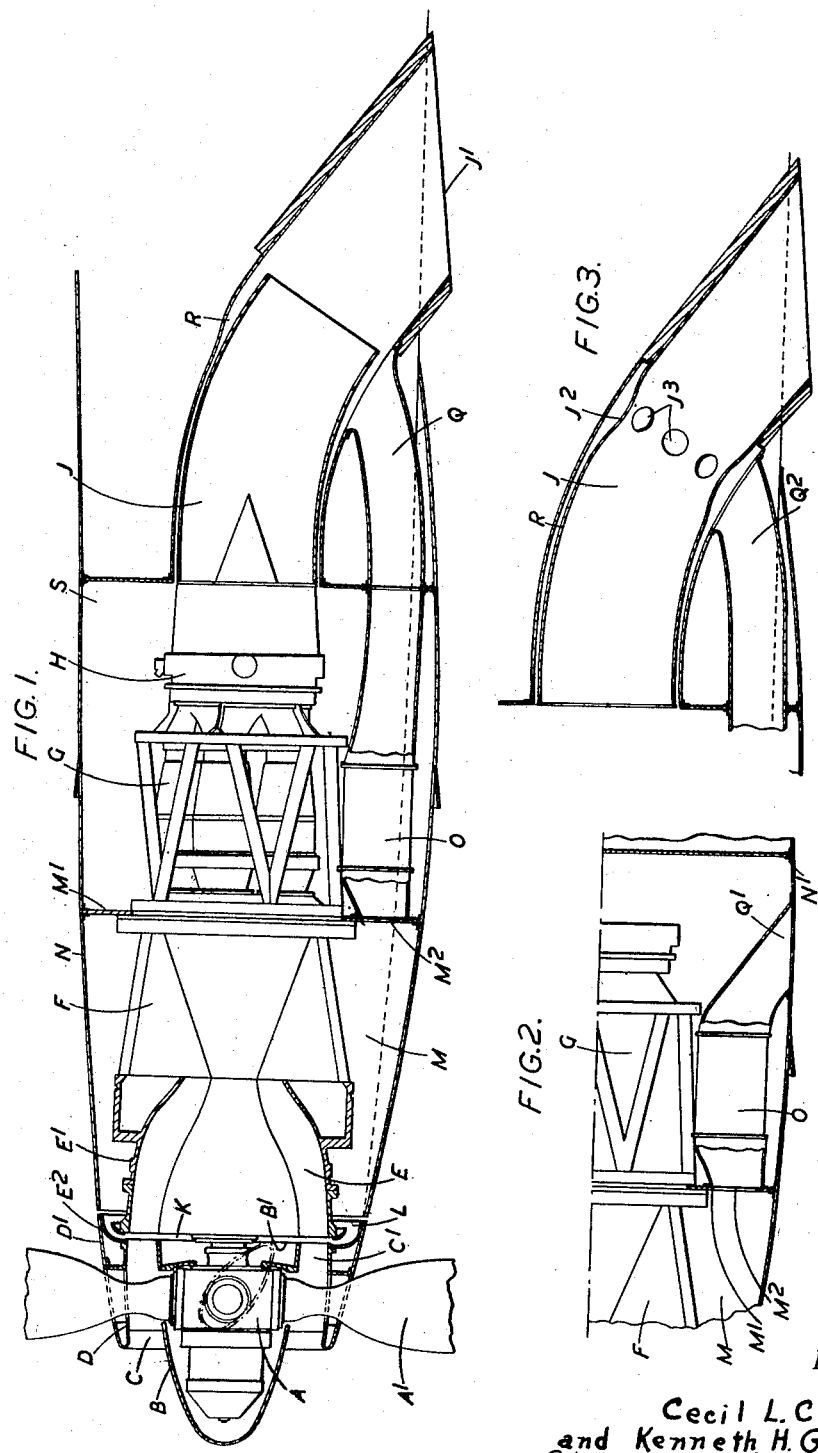

2,593,541

UNITED STATES PATENT OFFICE 2,593,541

COOLING APPARATUS FOR USE WITH AERO OR OTHER ENGINES

Cecil Louis Cowdrey, Markyate, and Kenneth Howard Greenly, Luton, England, assignors to D. Napier & Son Limited, London, England, a company of Great Britain Application April 5, 1948, Serial No. 19,094
In Great Britain April 3, 1947

7 Claims. (Cl. 170—135.743)

1

This invention relates to cooling apparatus for use with aero or other engines in power plant of the type wherein a propeller is driven by an engine which may be either an internal combustion turbine or a reciprocating internal combustion engine, the air for combustion of the fuel being drawn in through an annular air intake. In such engines it is known practice to allow the engine to draw the air in through an annular duct formed in and co-axial with the rotating spinner. This type of intake is commonly known as a ducted spinner intake.

In one form of such a ducted spinner the propeller mechanism and hub are enclosed within a streamlined fairing concentric with the axis about which the propeller rotates. Surrounding this fairing, and connected to it, is an outer wall which is commonly though not essentially made with a double skin, the annular space between the inner fairing and the wall spaced apart around it constitutes a rotating duct through which the air can pass to the engine. Such a duct has been employed to provide an intake for the air for use in the engine or for purposes associated therewith.

According to this invention there is combined with an annular ducted spinner air intake, an annular passage extending rearwards behind the spinner into which leads the intake through the spinner, an annular opening leading radially outwards through the wall of the whole annular intake passage and situated immediately behind the spinner, and one or more passages through which the air tapped off through this annular opening from the air which is flowing through the main annular intake is led to parts associated with the power plant for the purpose for example of effecting cooling or ventilation. In one arrangement the air thus tapped off from the main annular air intake is led to a cooler for oil or other liquid and flows thence to the engine exhaust. Alternatively, the air thus bled off from the main intake is led over the engine to effect cooling and ventilation, and thence flows to the engine exhaust.

In a ducted spinner the forward movement of the aircraft, vehicle or vessel, sets up an impact pressure in the main annular intake, and by providing a leak-off or bleed passage from this intake a proportion of the incoming air can be conveyed to the engine or other parts requiring an air supply.

The invention may be carried out in various ways of which examples are given in the accompanying drawings. In these drawings,

2

Figure 1 is a somewhat diagrammatic longitudinal sectional elevation of a part of an aircraft in which is an internal combustion turbine plant driving a propeller.

Figure 2 is a part of a similar view showing an alternative arrangement for the outflow of the cooling air.

Figure 3 is again a part of a similar view showing yet another arrangement for the outflow of the cooling air.

While in the following description and drawings the invention is described and illustrated as applied to an aircraft it is to be understood that it may be used in a similar way in a vehicle or vessel adapted to be propelled by a propeller operating in air. Further the power unit may be a reciprocating internal combustion engine in place of the internal combustion turbine plant shown by way of example.

Referring to Figure 1, this shows a ducted spinner which comprises the usual features in such a structure. The propeller hub A is enclosed in the spinner casing B around which is an annular air intake C formed between the casing wall B and an outer annular casing conveniently hollow with inner and outer walls $DD^1$. The annular duct $C^1$ from the intake opening C leads through the spinner to an annular passage E constituting the main air intake passage to the engine. For example and as here shown the air flowing through the passage E goes to a compressor F which delivers the air to combustion chambers G whence the gases pass to a turbine H which drives the compressor and the propeller $A^1$. The gases from the turbine pass to exhaust through the passage J which in the example shown is arranged to deliver these gases laterally at $J^1$.

Between the rear face $B^1$ of the ducted spinner and the front of the structure $E^1$ in which is the main air passage E to the engine there is a gap K which provides an annular opening through which some of the air flowing through the duct $C^1$ can be tapped off going initially in a radial direction. Leading from this gap opening K is an annular chamber L formed at the rear of the spinner by a part $E^2$ at the front of the structure $E^1$ and around the passage E. As may be seen this chamber L curves away rearwards and has the rear part wider in the radial direction than the entry into which leads the gap opening K. Air tapped off through the gap K is thus caused to flow rearwards and then may lead through or over such parts as desired. Thus in the example shown in Figure 1 the air tapped off through the gap K flows into a chamber M constituted by the space between the cowling N and the compressor F or other forward part of the power unit. The air in this chamber M will be at a pressure above that of the atmosphere outside the cowling. The chamber M terminates at its rear end in a bulkhead or partition $M^1$ with an opening $M^2$ therein leading to a cooler O of suitable construction and adapted for use with oil or other liquid the cooling of which is desirable in connection with the operation of the power plant. The air under pressure which has passed through this cooler may be disposed of in such a way as may be convenient. For instance as shown in Figure 1 the air leaving the cooler O is taken through piping Q to a jacket space R around the exhaust pipe J from the power unit. The air will thus have some cooling effect on this exhaust pipe and will pass out with the exhaust gases through the outlet $J^1$. By a suitable formation of these parts and for instance somewhat as shown, the exhaust gases as they flow out may have an eduction effect on the air coming from the cooler and thus assist in its flow through the cooler O.

The passage through which the air flows after passing through the cooler O may be carried out laterally, as at $Q^1$ in Figure 2, to an opening in the casing or cowling $N^1$, and not lead into the exhaust outlet.

In another alternative arrangement as shown in Figure 3 the air coming from the cooler through the piping $Q^2$ is led into a space R constituting an air jacket around the exhaust pipe J. At the place where the air enters this jacket the diameter of the exhaust pipe is somewhat reduced as at $J^2$ and in this part are holes $J^3$ through which the air will tend to be drawn by the outflow of the exhaust gases.

Instead of allowing the air tapped off from the intake $C^1$ to pass through a cooler such as O it may be caused to flow over the engine or a part associated therewith in order to effect a general ventilation. For this purpose the engine may be suitably encased in a pressure tight space such as S in Figure 1 into which the air may be allowed to pass from the chamber M through openings in the partition $M^1$. The air from the space S can then be drawn out through the air jacket R by the suction of the outflowing exhaust gases in the piping J.

In operation, when a power unit of the known type comprising the compressor F, the combustion chambers G, and the turbine H driving the compressor and the propeller $A^1$, is in operation with the exhaust gases passing from the turbine through the passage J, air enters the air intake opening C formed between the casing wall B and the outer annular casing D which together constitute a ducted spinner rotating with the propeller $A^1$, and flows through the annular duct $C^1$ in such spinner to the rear end of this annular duct. From this point the main air supply to the compressor F passes on through the air intake passage E to the inlet end of the compressor F in which it is compressed and delivered to the combustion chambers G wherein part of it at least is burnt and from which the hot gases pass through the turbine H to the exhaust pipe J. At the same time a proportion of the air which flows to the rear end of the annular duct $C^1$ is tapped off through the radial gap or opening K through which it flows radially outwards into the chamber M and thence through the opening $M^2$ and the oil cooler O and passage Q, $Q^1$ or $Q^2$ to the outlet $J^1$ or $J^3$ or direct to the atmosphere.

It will be apparent that the air bled or tapped off through the gap K will not be liable to carry with it ice, snow or foreign matter which may tend to enter the intake C more especially in the case of aircraft.

The detail formation and arrangement of the passage, chamber and other places through which the air is caused to flow after being tapped off from the intake may vary in accordance with requirements, as for instance the type of power unit to which the invention is applied and the purposes for which the air is to be used.

What we claim as our invention and desire to secure by Letters Patent is:

1. An internal combustion power plant comprising a power source driving a propeller having a hub, a spinner mounted on said hub for rotation therewith, said spinner having outer and inner walls providing between them, an annular air intake duct around the hub, a fixed annular duct to the rear of and in line with the said spinner duct, the rotating and fixed ducts together forming an intake passage through which air flows to the power source, an annular opening leading radially outwards through the wall of the said intake passage through which radial opening air can be tapped off from the air flowing through the said passage, a casing enclosing the power source and providing a space around the said fixed annular duct with means for leading into this space the air tapped off through the said annular opening, and means whereby this tapped off air is used with cooling effect on at least some part of the power plant.

2. An internal combustion power plant comprising a power source driving a propeller having a hub, a spinner mounted on said hub for rotation therewith, said spinner having outer and inner walls providing between them an annular air intake duct around the hub, a fixed annular duct to the rear of and in line with the said spinner duct, the rotating and fixed annular ducts together forming an intake passage through which air flows to the power source, there being a gap between the rear end of the said annular spinner duct and the adjacent forward end of the said fixed annular duct this gap constituting an opening through the wall of said air intake passage to the power source, a casing enclosing the power source and providing a space around the said fixed annular duct with means for leading into this space the air which has passed outwardly through the said annular gap opening, and means whereby this air is used with cooling effect on at least some part of the power plant.

3. An internal combustion power plant including the features set forth in claim 1, and in which the exhaust gases from the power source are led away through an exhaust gas passage with means whereby the air tapped off from the said air intake passage is finally led into the said exhaust gas passage, the entry of the said air into the said exhaust passage being induced by the formation and arrangement of the parts where the air is led into the exhaust passage.

4. An internal combustion power plant as set forth in claim 1 including a liquid cooler and means for circulating tapped off air through said cooler.

5. An internal combustion power plant as set forth in claim 4 having a passage for discharging the exhaust gases from the power source, means including suitable passages whereby the air tapped off from the intake passage after circulating through the cooler is conducted into said exhaust gas discharge passage, the entry of said air into said exhaust gas passage being induced by the formation and arrangement of the passages at the point of entry.

6. An internal combustion power plant comprising a power source driving a propeller having a hub, a spinner mounted on said hub for rotation therewith, said spinner having outer and inner walls providing between them an annular air intake duct around the hub leading in the axial direction through the spinner, an annular air intake duct in the non-rotating structure at the rear of the spinner, the rear end of the duct in the spinner and the forward end of the duct in the non-rotating structure registering so that together these ducts form an intake passage through which air flows to the power source, there being a gap in the wall of this air intake passage between the adjacent ends of the said two annular ducts the gap constituting an annular opening through which air can flow outwards and thus be tapped off the air flowing through the whole of the said intake passage to the power source, a casing enclosing the power source and providing a space around the said annular intake duct in the non-rotating structure, means for leading into this space the air tapped off through the said annular gap opening in the wall of the intake passage, and means whereby this air is used with cooling effect on at least some part of the power plant.

7. An internal combustion power plant as set forth in claim 6 having a liquid cooler and means for conducting air tapped off from the air intake passage to said liquid cooler for cooling liquid therein used in the operation of said plant.

CECIL LOUIS COWDREY.
KENNETH HOWARD GREENLY.

REFERENCES CITED

The following references are of record in the file of this patent:

UNITED STATES PATENTS

| Number | Name | Date |
| --- | --- | --- |
| 1,414,418 | Jaray | May 2, 1922 |
| 1,611,658 | Magni | Dec. 21, 1926 |
| 1,907,454 | Squires | May 9, 1933 |
| 2,356,557 | Anxionnaz et al. | Aug. 22, 1944 |
| 2,390,161 | Mercier | Dec. 4, 1945 |
| 2,404,767 | Heppner | July 23, 1946 |
| 2,405,422 | Halford et al. | Aug. 6, 1946 |
| 2,464,724 | Sedille | Mar. 15, 1949 |

FOREIGN PATENTS

| Number | Country | Date |
| --- | --- | --- |
| 541,349 | Great Britain | Nov. 24, 1941 |
| 543,219 | Great Britain | Feb. 16, 1942 |
| 584,169 | Great Britain | Jan. 8, 1947 |